US008399602B2

(12) United States Patent
Hagen et al.

(10) Patent No.: US 8,399,602 B2
(45) Date of Patent: Mar. 19, 2013

(54) POLYMERISATION REACTOR, POLYMERISATION DEVICE, METHOD FOR PRODUCING BIO-DEGRADEABLE POLYESTER AND USES

(75) Inventors: Rainer Hagen, Berlin (DE); Udo Muhlbauer, Berlin (DE)

(73) Assignee: Uhde Inventa-Fischer GmbH (DE)

( * ) Notice: Subject to any disclaimer, the term of this patent is extended or adjusted under 35 U.S.C. 154(b) by 369 days.

(21) Appl. No.: 12/676,299

(22) PCT Filed: Aug. 25, 2008

(86) PCT No.: PCT/EP2008/006967
§ 371 (c)(1),
(2), (4) Date: Jun. 29, 2010

(87) PCT Pub. No.: WO2009/030397
PCT Pub. Date: Mar. 12, 2009

(65) Prior Publication Data
US 2010/0261838 A1    Oct. 14, 2010

(30) Foreign Application Priority Data
Sep. 3, 2007  (EP) ..................................... 07017235

(51) Int. Cl.
*C08G 63/08* (2006.01)
*C08F 2/00* (2006.01)
(52) U.S. Cl. ............. 528/354; 526/64; 526/65; 526/266
(58) Field of Classification Search .................. 422/220, 422/228, 645, 648; 526/321; 528/272, 354
See application file for complete search history.

(56) References Cited

U.S. PATENT DOCUMENTS

| 3,572,391 | A | * | 3/1971 | Hirsh | ............................... | 138/40 |
| 4,354,020 | A | * | 10/1982 | Rotzoll et al. | ................. | 528/323 |
| 5,484,882 | A | * | 1/1996 | Takada et al. | ................. | 528/361 |

FOREIGN PATENT DOCUMENTS

| DE | 1 136 310 | 9/1962 |
| EP | 0 087 817 A1 | 9/1983 |

OTHER PUBLICATIONS

"International Application Serial No. PCT/EP2008/006967, English Translation of International Preliminary Report on Patentability issued Dec. 28, 2009", 4 pgs.
"International Application No. PCT/EP2008/006967, International Preliminary Examination Report", (Dec. 28, 2009), 10 pgs.
"International Application No. PCT/EP2008/006967, International Search Report and Written Opinion", (Feb. 5, 2009), 11 pgs.
"International Application No. PCT/EP2008/006967, Request for International Preliminary Examination", (Jun. 25, 2009), 4 pgs.

\* cited by examiner

*Primary Examiner* — David W Wu
*Assistant Examiner* — Elizabeth Eng
(74) *Attorney, Agent, or Firm* — Schwegman Lundberg & Woessner, P.A.

(57) ABSTRACT

The present invention relates to a polymerization reactor for continuous polymerization, the reactor being constructed in two stages and comprising a prepolymerization stage which is configured as a stirred vessel or as a loop-type bubble column and also a main polymerization stage which is configured as a tubular reactor. Furthermore, the present invention relates to a method for the production of biodegradable polyester, in particular polylactide, the reactor according to the invention being used. Likewise, the invention relates to a polymerization device which comprises further components in addition to the polymerization reactor.

15 Claims, 2 Drawing Sheets

Figure 1:
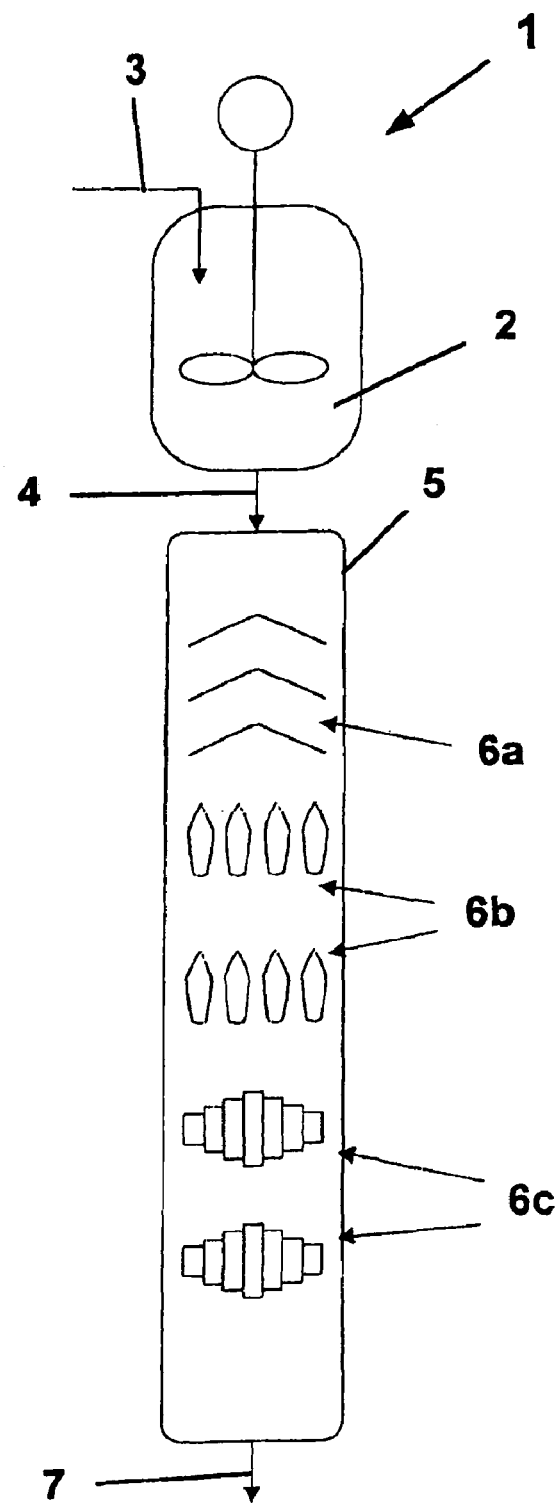

POLYMERISATION REACTOR, POLYMERISATION DEVICE, METHOD FOR PRODUCING BIO-DEGRADEABLE POLYESTER AND USES

PRIORITY CLAIM TO RELATED APPLICATIONS

This application is a national stage application under 35 U.S.C. §371 of PCT/EP2008/006967, filed Aug. 25, 2008, and published as WO 2009/030397 A1 on Mar. 12, 2009, which claims priority to European Application No. 07017235.8, filed Sep. 3, 2007, which applications and publication are incorporated herein by reference and made a part hereof in their entirety, and the benefit of priority is claimed thereto.

Embodiments of the present invention relate to a polymerisation reactor for continuous polymerisation, the reactor being constructed in two stages and including a prepolymerisation stage which is configured as a stirred vessel or as a loop-type bubble column and also a main polymerisation stage which is configured as tubular reactor. Furthermore, embodiments of the present invention relate to a method for the production of biodegradable polyester, in particular polylactide. Likewise, embodiments of the invention relate to a polymerisation device which includes further components in addition to the polymerisation reactor.

A polymerisation reactor is known from U.S. Pat. No. 5,484,882 for the production of copolyester from cyclic esters in combination with lactones, which polymerisation reactor comprises a stirred vessel and also a static mixer. It is known that the copolymers described in this patent specification have a substantially lower melt viscosity at the same temperature than a homopolymer comprising only one of the two components mentioned there. If the intention is therefore to produce a homopolymer, in particular polylactide, the polymerisation reactor which is described in U.S. Pat. No. 5,484,882 and has a static mixer as the main polymerisation stage has disadvantages since the substantially higher melt viscosities of for example polylactide lead to a high pressure loss of 200 bar, even to obstructions and/or blockages of such a static mixer. Obstructions or blockages of this type frequently lead to production stoppages of such plants which are associated with expensive down-times or cleaning of the polymerisation device.

The closest state of the art is U.S. Pat. No. 5,484,882. The combination of a stirred vessel with a static mixer is mentioned there. However the crude material is a cyclic ester combined with at least one lactone. A copolymer is therefore produced. It is known that copolymers have a substantially lower melt viscosity at the same temperature than a homopolymer comprising only one of the two co-components. In the case of copolymers, melt viscosities of 100 to 5,600 Pa·s may be encountered. In contrast, homopolymers can have melt viscosities up to 25,000 Pa·s.

Embodiments of the present invention provide a polymerisation reactor and also an associated polymerisation device, with which simple and efficient polymerisation, in particular of homopolymers, such as for example polylactide, is possible. Furthermore, the present invention provides a method for the production of biodegradable polyester and/or copolyester, in particular polylactide, with which polylactides can be produced with high purity, the method being able to be implemented in a reliable manner.

This is achieved with respect to the polymerisation reactor and the polymerisation device by the method and by the features of the patent claims. The respectively dependent claims represent advantageous developments. Possibilities for use are mentioned in the patent claims.

According to the invention, a polymerisation reactor for continuous polymerisation is hence provided which comprises at least the following components:

a) at least one stirred vessel and/or one loop-type bubble column as first polymerisation stage, and also subsequent thereto b) at least one tubular reactor as second polymerisation stage, the tubular reactor having baffles which standardise the speed profile of the throughflowing fluid over the cross-section of the tubular reactor.

The baffles according to the invention which standardise the flow differ from a static mixer in that they do not mix, i.e. separation into partial flows and subsequent axial and radial rearrangement of the partial flows. The baffles according to the invention now exert a flow resistance which is dimensioned specifically in the axial direction so that an almost uniform profile of the flow velocity over the tubular cross-section is attained. The filaments of flow are not thereby rearranged but remain almost parallel and are merely mutually accelerated or decelerated. A preferred criterion for the standardisation is that the quotient of minimum dwell time of a filament of flow and the average dwell time of the reactor content at the outlet of the tubular reactor is not less than 0.5.

A loop-type bubble column is a reactor which enables back mixing of the reaction mixture by guiding in a loop, as a result of which the polymerisation reaction can be facilitated.

In principle, all baffles are therefore suitable which effect equalisation of the flow profile over the cross-section of the tubular reactor. Fluids which flow through a pipe have, in the normal case, i.e. without baffles in the pipe, a parabolic speed profile over the cross-section of the pipe (laminar flow profile). The polymerisation reaction and the increase in melt viscosity associated therewith lead in contrast to even greater deceleration of the melt in regions close to the wall and to extreme acceleration in regions near to the axis with "shooting through" of hardly polymerised material in the vicinity of the pipe axis. Hence the flow velocities in the middle of the pipe are greatest whilst the flow of the fluid at the regions of the pipe close to the wall is slowed down as a result of frictional forces. It is hence the object of the invention to effect standardisation of the flow profile, i.e. to ensure a flow profile which is standardised as far as possible over the entire cross-section of the pipe so that the flow velocity of the fluid is equally great as far as possible everywhere in the pipe. As a result, very thorough mixing of the highly viscous polymer melt and thereby occurring high shear forces are prevented, which have a negative effect on the polymer quality, on the one hand, and, on the other hand, cause obstructions in the tubular reactor. There should be mentioned as a further advantage relative to static elements which cause a strong permanent mixing of the polymer melt that a lower flow resistance is hence achieved which, in particular with increasing viscosity, has a negative effect in devices of the state of the art. With the device according to the invention, an easily implementable polymerisation is hence possible up to very high average molar masses with a simultaneously excellent produce quality.

Advantageously, this is effected by baffles in the pipe, which are selected from the group comprising perforated hole discs, concentric annular gaps, displacement bodies and/or tubular elements. The mentioned baffles prevent, at the same time, mixing of the fluid since, as a result of mixing processes, the result continues to be the problems known from the state of the art. The perforated discs thereby have a quasi two-dimensional configuration, i.e. they extend over the pipe cross-section, without thereby having a significant axial extension, and preferably have holes with variable diameters which are disposed on circular lines which are concentric to the pipe axis. Likewise, the possibility is also presented of using concentric annular gaps as baffles. In the case of annular gaps, two embodiments are hereby conceivable, on the one hand, a quasi two-dimensional embodiment which is configured analogously to the perforated hole discs, i.e. that the annular gaps which are disposed further on the wall side with respect to the tubular reactor increase in width but, on the other hand, also the embodiment that the annular gaps have a three-dimensional configuration, i.e. have yet a further dimension in the axial direction of the tubular reactor.

In the case of two-dimensional baffles, the equalisation of the flow profile can also be caused by the shape of the baffles themselves. Alternatively or in addition to the variation in the size of the holes or gaps, the two-dimensional baffles can be stamped for example in a concentric conical form, the tip of the cone pointing contrary to the flow direction of the fluid. There is thereby understood by concentric conical form that the cone tip is situated disposed in the centre with respect to the surface of the two-dimensional baffle element. It is consequently achieved that the fastest flowing part of the fluid impinges on the cone tip and is deflected to the side via the envelope of the cone. As a result of the thereby occurring transverse forces which partially counteract the axial movement of the fluid, the result is deceleration of the part of the fluid situated in the centre of the tubular reactor and hence standardisation of the speed profile.

As an alternative to three-dimensional annular gaps, also tubular elements are conceivable, the tubes which are disposed further in the centre of the tubular reactor having a smaller diameter than pipes introduced further to the edge of the tubular reactor. The tubular elements can thereby be configured in a three-dimensional embodiment of the perforated discs or as bundles of individual pipes. The common criterion thereby is that the pipe diameter increases with increasing radial distance from the centre. Likewise, standardisation of the flow profile of the fluid and hence equalisation of the velocity is possible over the entire pipe cross-section by means of correspondingly fitted displacement bodies.

In the case of the three-dimensionally configured elements, in particular the concentric annular gaps, displacement bodies and/or tubular elements, it is preferred if they are configured, dependent upon the radial arrangement thereof with respect to the cross-section of the tubular reactor, with different lengths in the axial direction of the tubular reactor. Hence, an additional or alternative possibility is presented of equalising the flow velocity of the corresponding fluid in the reactor over the cross-section of the reactor. The thereby underlying principle is likewise the friction of the fluid at the corresponding three-dimensionally configured baffle elements. As a result of the fact that the baffles have a greater length in the centre of the reactor in the axial orientation, greater friction is produced between the fluid and the respective baffle element than at the baffles which are fitted further on the wall side and are configured to be shorter in the axial direction of the tubular reactor. Hence, an increased deceleration of the fluid takes place in the centre of the tubular reactor than at the edge regions. It is hereby advantageous also if the axial length distribution of the baffle elements correlates with the unbraked, laminar flow velocity profile.

A multiple arrangement of the same or different baffles in succession within one tubular reactor is thereby possible.

Furthermore, it is an advantageous feature of the polymerisation reactor if it is ensured by the baffles that the quotient of minimum dwell time of the part of the fluid which flows most quickly through the tubular reactor and the average dwell time of the entire fluid in the tubular reactor is at least 0.5.

In a further advantageous embodiment of the polymerisation reactor according to the invention, it is ensured that, when flowing through the reactor, the moulding materials to be polymerised essentially experience no radial mixing or homogenisation. This can be expressed by the maximum variation coefficient V of 0.8, preferably 0.5, V being defined according to the following equation $$V = \frac{S}{c_S}$$

S thereby represents the random sample variance $$S = \sqrt{\frac{1}{n-1} \sum_{i=1}^{n} (c_i - c_S)^2}$$

and $c_i$ the concentration of an indicator substance of a random sample removed at a randomly chosen position i of the outlet surface of the tubular reactor, the indicator substance being able to be introduced from a randomly chosen position of the inlet surface of the tubular reactor, $c_s$ being the arithmetic mean of the concentrations of the removed random samples according to $$c_S = \frac{1}{n} \sum_{i=1}^{n} c_i$$

and n meaning the number of random samples.

In order to determine the variation coefficient, hence the distribution of an indicator substance is determined which is added almost at points to the mass to be polymerised at any position of the inlet surface of the tubular reactor. The removal points of the random samples are thereby chosen randomly over the entire surface of the outlet opening of the reactor. Typical indicator substances for polymers are for example temperature-resistant colourants. They are dissolved in a suitable solvent with a low vapour pressure at high concentration and are injected into the polymer melt in the form of an abrupt marking (very short time span) at the reactor inlet. The quantity of injected colourant is thereby calculated such that the samples drawn at the reactor outlet have an evaluatable colourant concentration.

For analysis, the samples are dissolved in a suitable solvent (e.g. chloroform for PLA) and the colourant concentration is measured in a photometer at light wavelength which is dependent upon the colourant via the extinction.

It is ensured by means of the above-mentioned baffles and also the preferably resulting value of the variation coefficients that radial mixing of the substances introduced into the reactor is for the most part prevented. It is particularly advantageous hereby that, due to the chosen form of the baffles in the tubular reactor, shear forces which are normally used to mix the introduced moulding materials, do not occur and hence a significantly gentler polymerisation reaction which has less mechanical effect on the reaction item is possible. Typical defects in the resulting polymers, such as for example discolouration of the product due to increased concentrations of degradation products, can hence almost be entirely prevented.

It is further preferred if the ratio $$\frac{L}{D \cdot \tau}$$

of the tubular reactor, L representing the length of the tubular reactor, D the diameter of the tubular reactor and τ the dwell time of a reaction mixture in the tubular reactor, is less than 30/h, preferably <20/h, particularly preferred <10/h. In contrast thereto, in the case of static mixers, normally a ratio of greater than 30/h is chosen in order to achieve the required flow velocities for efficient transverse mixing. The mentioned condition is a further index for the radial mixing being extensively prevented in the tubular reactor according to the invention.

Likewise it is of advantage if the baffles are disposed concentrically with respect to the longitudinal axis of the tubular reactor.

It is hereby advantageous in particular if the baffles are separated from the reactor wall by a concentric gap, the gap preferably being between 1% and 10% of the reactor radius.

Furthermore, it is advantageous if the free cross-sectional area of the baffles has a radial distribution. The radial distribution hereby means that, for example in the vicinity of the longitudinal axis of the tubular reactor, the baffles have a smaller free cross-sectional area through which the reaction mixture flows, whilst the free cross-sectional area of the baffles has greater values at the periphery, i.e. at positions further removed radially from the longitudinal axis of the reactor.

If the cross-sectional area of the tubular reactor is subdivided into three concentric circular rings with a circular ring width of a third of the radius, then it is particularly advantageous if the proportion of the free cross-sectional area in the inner circular ring is less than 70%, in the central circular ring between 10% and 75% and in the outer circular ring more than 20%. In contrast to static mixers, the baffles of which generally have a uniform geometry, not only the free cross-sectional area is radially variable but also axially in the case of the tubular reactor according to the invention. This construction and the arrangement of the baffles is thereby adapted, in the direction of a solution, to the viscosity in the tubular reactor which is increasing greatly because of the polymerisation reaction. Hence, complete homogenisation of the flow profile is achieved.

The first stage of the polymerisation device is a reactor with back mixing (stirred vessel or loop-type bubble column). A loop-type bubble column is a successive connection of a plurality of tubular reactors connected to form a ring. In this stage, a homogeneous prepolymer with a conversion degree of max. 70% is produced. The viscosity thereby increases from a few mPa·s of the monomer to values between 50 and 500 Pa·s of the prepolymer. This viscosity is required in order to be able to effect the necessary pressure increase which is required for the subsequent tubular reactor. In order to avoid very high pressures at the inlet of the tubular reactor, it is preferred if at least two tubular reactors are connected successively and a pump is incorporated between these. With such an arrangement, very high molecular weights and conversion degrees can be achieved.

In a further advantageous embodiment, it is thereby provided that the wall of the tubular reactor and/or the baffles can be cooled and/or heated via a heat carrier. Hence, the reaction conditions in which the respective polymerisation takes place, can be specifically controlled. It is for example advantageous to cool the reactor or the baffles in the case of exothermic reactions, whilst the reactor can be heated in the case of endothermic processes.

According to the invention, a polymerisation device for the polymerisation of a biodegradable, intermolecular cyclic diester of an alpha-hydroxycarboxylic acid of formula I is provided,

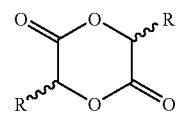

Formula I

R being selected from hydrogen or linear or branched aliphatic radicals with 1 to 6 carbon atoms or is preferably dilactide, a previously described polymerisation reactor and at least one cleaning device being included for cleaning the cyclic diester of formula I.

Furthermore, it is thereby advantageous if the cleaning device for cleaning the previously mentioned cyclic diester of formula I is thereby connected in front of the reactor. In this cleaning device can thereby be for example a separating screen column.

In the case of the cleaning device, it is likewise advantageous if the top condenser is configured as a dephlegmator which is disposed subsequent to an additional condensation device for condensation of the diester of formula I from the remaining vapours.

The previously mentioned possibilities in which the polymerisation reactor is a component of a production plant for the production of polylactide hence ensure that a very efficient production of polylactide is made possible, starting from the crude product lactic acid with high purity.

According to the invention, a method for the production of biodegradable polyester and/or copolyester by means of ring-opening polymerisation at least of one intermolecular cyclic diester of formula I is provided,

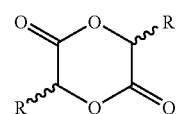

Formula I

R being selected from hydrogen or linear or branched aliphatic radicals with 1 to 6 carbon atoms, by the steps
a) feeding a mixture containing the diester of formula I into the first polymerisation stage of the polymerisation reactor and implementing a prepolymerisation, and also
b) transferring the obtained prepolymer into the second polymerisation stage of the polymerisation reactor and implementing a polymerisation reaction.

It is thereby advantageous in particular if the method is conducted such that the quotient of minimum dwell time of the part of the fluid flowing fastest through the tubular reactor and the average dwell time of the entire fluid in the tubular reactor is at least 0.5.

The method control is configured thereby in particular in such a manner that the prepolymerisation is implemented in step a) up to maximum conversion of the cyclic diester of formula I of 5 to 70% by mol, preferably 30 to 60% by mol. Determination of the conversion is thereby effected by determination of the monomer content in the outlet of the reactor, e.g. by gas chromatography.

After transferring the thus produced prepolymer, the polymerisation reaction is implemented in step b) preferably up to a maximum melt viscosity of 100 Pa·s to 25,000 Pa·s, preferably from 500 Pa·s to 20,000 Pa·s.

By means of a thus configured polymerisation, very high conversion rates can be achieved. Preferably, the polymerisation reaction is implemented in step b) up to a conversion of the cyclic diester of formula I of at least 90% by mol, preferably at least 92.5% by mol, particularly preferred at least 95% by mol.

In a further advantageous embodiment, stabilisers are mixed in subsequent to step b).

It is furthermore advantageous if, subsequent to step b), demonomerisation is effected by extraction with a solvent and/or by vacuum degassing.

Likewise, it is advantageous if polymerisation catalysts are mixed into the mixture before step a) and/or before step b).

The method according to the invention also discloses that, subsequent to step b), at least one additive can be mixed in, selected from the group comprising nucleation agents, colourants, reinforcing materials, processing aids, plasticisers, modification agents, fillers and/or antioxidants.

The possibility is likewise presented by the method according to the invention to mix into the produced polyester and/or copolyester, subsequent to b), further polymers, for example at least one further polyester (e.g. PBS (polybutylene succinate)) and/or a polyether (e.g. polyethylene glycol) and hence to produce blends. The quantity of the respective added polymer is variable over wide ranges and is adjusted by the person skilled in the art according to the desired properties of the product.

The method is particularly suitable for the production of polylactide, starting here from dilactide.

The present invention is explained in more detail with reference to the subsequently illustrated Figures and also the examples. The embodiments represented in the Figures should however thereby be understood merely by way of example and in no way restrict the invention to the combinations of features represented there.

Figure 2:
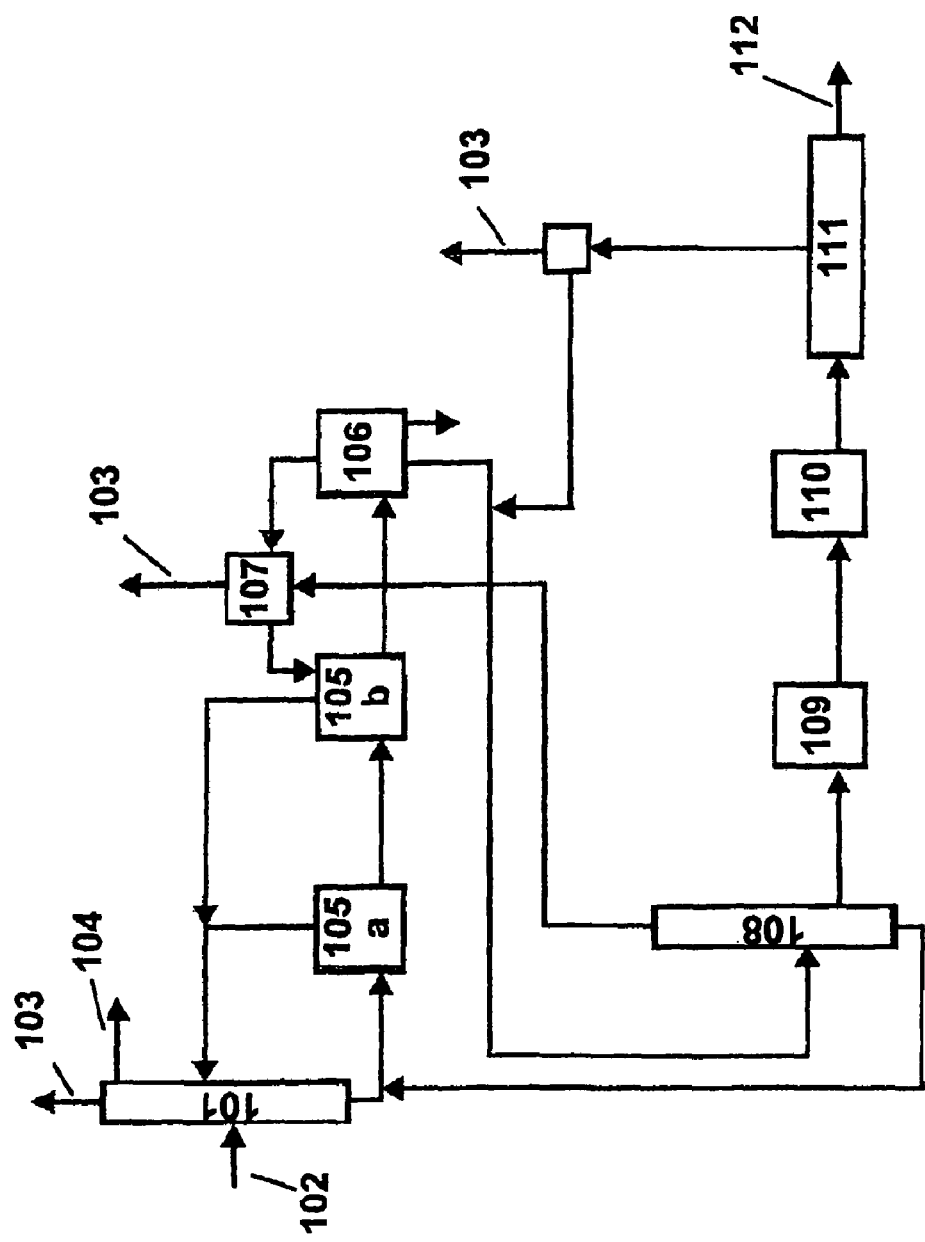

There are thereby shown:

FIG. 1 an embodiment of a polymerisation reactor according to the invention, and FIG. 2 a schematic representation of the total process of polymerisation of lactide, starting from lactic acid, with reference to an embodiment of a polymerisation device according to the invention.

A polymerisation reactor 1 according to the invention is represented in FIG. 1, which thereby comprises a stirred vessel 2 as first polymerisation stage and also a tubular reactor 5 as further polymerisation stage. The monomer dilactide is thereby conducted via the pipeline 3 into the stirred vessel and is prepolymerised there until conversion of approx. 50-70% of the monomer. The determination of the conversion rate is thereby effected by determining the content of residual monomer at the outlet of the stirred vessel. The determination is thereby effected by means of methods familiar to the person skilled in the art, such as for example chromatographic measuring methods. After the conclusion of the prepolymerisation, the content of the stirred vessel is supplied via the pipeline 4 to the tubular reactor 5. The polymerisation up to the finished product takes place in the tubular reactor 5. In order to standardise the flow profile over the cross-section of the tubular reactor 5, the same or different baffles 6 are thereby provided in the tubular reactor 5. For example, there can be involved here perforated hole metal sheets 6a, displacement bodies 6b or tubular elements 6c. In the case of the baffles 6b and 6c with a three-dimensional extension, these are configured in the axial orientation with respect to the tubular reactor 5 such that they ensure standardisation of the flow profile. It is evident for example in the case of tubular elements 6c that a configuration of different lengths of the tubular elements in the axial direction of the tubular reactor 5 is provided here. As a result of the increased friction forces of the fluid in the centre of the reactor at the tubular elements 6c, deceleration of the fluid flow in the centre is hence ensured. This leads to standardisation of the flow profile. The finished product is removed after conclusion of the polymerisation reaction via the outlet 7.

In FIG. 2, the continuous total process of the polylactide production (PLA process), starting from lactic acid, with a polymerisation device 100 according to the invention is represented. The process is subdivided thereby into the following partial steps which are performed with the individual components integrated in the polymerisation device 100 and explained subsequently in more detail.

1. Concentration of Lactic Acid

The starting material for the process is lactic acid. The content of lactic acid must thereby be higher than 80% by weight. Preferably, the lactic acid concentration is thereby more than 90% because the water must be removed before polymerisation. The separation of water and lactic acid is thereby undertaken in a rectification column 101. A vacuum is thereby applied via a suction connection piece 103, the water present in vapour form is condensed and removed at the top via a further connection piece 104. The supply of the lactic acid is thereby effected continuously via a further connection piece 102. The distillate is pure water, the product occurring on the sump side is lactic acid with a concentration of more than 99% by weight.

In addition to separation of water from the original material (lactic acid), the rectification column 101 likewise serves for separation of the vapours from the precondensation reactors 105a and 105b. The vapour flows thereby comprise lactic acid, lactoyllactate, dilactide and water. The water is withdrawn at the top, lactic acid and derivatives thereof go into the sump of the rectification column and from there, together with the up-concentrated lactic acid, into the first precondenstion reactor 105a.

2. Precondensation

The up-concentrated lactic acid is converted into a prepolymer in a series of two reactors 105a and 105b by polycondensation. The polycondensation takes place at two different pressures and temperatures in order to optimise the reaction conversion. In the first reactor 105a, the conditions are chosen such that the evaporation of lactic acid is minimised and the removal of water is facilitated at the same time. In the second step of the polycondensation, the reaction speed is increased by a higher temperature, the pressure is reduced at the same time in order further to reduce the water concentration in the melt. The average molar mass (number average) of the prepolymer is thereby between 500 and 2,000 g/mol.

3. Cyclising Depolymerisation

The prepolymer is in chemical equilibrium with the cyclic dimer of the lactic acid, the dilactide. By adjusting pressure and temperature in the depolymerisation reactor 106, it is ensured that the lactide is formed continuously from the prepolymer and evaporated. A condenser is associated with the depolymerisation reactor 106, which partially condenses the reaction vapours: water and the largest proportion of lactic acid thereby remain in vapour form and again are partially condensed in the condensation device 107. The condensate from the depolymerisation reactor 106 first and foremost contains the lactide, lactoyllactate (the linear dimer of lactic acid) and higher linear oligomers.

4. Lactide Cleaning

During the ring-opening polymerisation, the achievable molecular weight and hence significant mechanical properties of the polylactide depend upon the degree of purity of the lactide. The hydroxyl groups of the lactic acid and lactoyl-lactate contained as impurity thereby serve as the starting point of the polymerisation. The higher the concentration of the hydroxyl groups in the lactide, the less the achievable molecular weight of the polymer turns out to be. The concentration of the hydroxyl groups in the crude lactide is too high after the cyclising depolymerisation. The condensed lactide is cleaned in a rectification column 108 up to the required hydroxyl group concentration. The cleaned lactide is removed as side flow from the column 108. The distillate and the sump product are supplied again to the process at various places. In addition to the molecular weight of the polylactide, its properties are greatly influenced by the D-content (the quantity of structural units which have the D-configuration) or in the case of polymerisation by D-lactide by the L-lactide content.

5. Ring-Opening Polymerisation

The ring-opening polymerisation is undertaken in a reactor according to the invention which is formed from a combination of a stirred vessel 2 and a tubular reactor 5. In the first reactor 109, the low-viscous lactide is polymerised to form PLA with a conversion rate of approx. 50-70%. Catalyst and additives are mixed homogeneously into the melt.

In the tubular reactor 5, the polymerisation reaction is continued until a chemical equilibrium between polymer and monomer is reached. The maximum conversion of the monomer is approx. 95%. During polymerisation, the viscosity is increased to approx. 10,000 Pa·s.

6. Demonorrierisation

In order to obtain a stable polylactide, the monomer concentration of approx. 5% by weight in the melt is too high. For this reason, demonomerisation must be implemented. This is achieved by degassing the melt e.g. in a twin-screw extruder 111. On the basis of the fact that the ring-opening polymerisation is an equilibrium reaction, a stabiliser is added before the demonomerisation in order to prevent the re-formation of the monomer during and after the degassing.

7. Granulation and Crystallisation

Subsequent to the demonomerisation, the melt is removed from the demonomerisation device 111 and converted into a granulate 112. Both strand granulation and underwater die-face pelletisation can thereby be implemented. In both cases, the PLA granulate must be crystallised before drying and packaging. The crystallisation is implemented at increased temperatures and with agitation.

EXAMPLE 1

Flow Simulation

The flow in a tubular reactor, in which ring-opening polymerisation of dilactide into polylactide takes place, is simulated with software for flow simulation. The inflow comprises a prepolymer, a mixture of dilactide and polylactide, as typically emerges from a stirred vessel reactor (see example 2). The inlet viscosity is 100 Pa·s. The tubular reactor has an L/D ratio of 5 and the total dwell time is 6 h. The tubular reactor is subdivided into four segments, each of which is provided with a perforated screen.

The tubular or flow reactor 5 is a pipe with a double jacket which is provided with baffles. The dwell time in the reactor is six hours. The baffles comprise a combination of perforated discs, displacement bodies and concentric annular gaps. Geometries and fixture positions were optimised in advance with the help of a flow simulation with respect to a uniform flow profile.

Optimisation parameters are:
1. In the case of the perforated metal sheets
    number of perforated metal sheets in the reactor,
    number of holes per disc,
    hole diameter and hole diameter distribution,
    arrangement of the holes on the disc,
    spacing between reactor wall and edge of the perforated metal sheet.
2. In the case of the displacement bodies
    number of bodies per level,
    spacing between the bodies,
    geometric form of the bodies as a function of the position.
3. In the case of the concentric annular gaps
    height,
    width,
    number of individual annular gaps.

As a result of the flow simulation, a construction of the baffles in the tubular reactor, which is optimised with respect to a uniform flow profile, is obtained. Thus there is produced for the first perforated disc in the flow direction a proportion of free cross-sectional area for the inner third of 2%, for the middle third of 54% and for the outer third of 47%. The thirding of the cross-sectional area relates to the radius.

EXAMPLE 2

In a continuous pilot plant, 2 kg/h of cleaned dilactide are produced. The dilactide has an average carboxyl end group concentration of 10 mmol/kg (measured by acid-base titration) and a mesodilactide content of 5% (measured by HPLC). The dilactide is mixed with tin octoate as catalyst with a concentration of 40 ppm tin and flows into a stirred vessel reactor 2 which is equipped with an anchor agitator and is temperature-controlled via a double jacket. In the stirred vessel reactor, the ring-opening polymerisation of dilactide into polylactide takes place. The dwell time in the reactor is four hours and the temperature of the melt 160° C. The product has a melt viscosity of 100 Pa·s at a temperature of 160° C.; the conversion is 40%. The dilactide-polylactide melt is removed continuously and pumped into the following tubular reactor 5, the baffles of which are constructed according to the results of example 1.

Samples were removed at the outlet of the tubular reactor for 20 minutes at an interval of one minute and analysed with respect to conversion, intrinsic viscosity and polydispersion index. The results are displayed in the following table.

| Time Min | IV dl/g | Conversion % | PDI |
|---|---|---|---|
| 1 | 1.86 | 94.2 | 1.98 |
| 2 | 1.87 | 93.8 | 1.99 |
| 3 | 1.86 | 94.7 | 2.02 |
| 4 | 1.86 | 95.1 | 1.97 |
| 5 | 1.83 | 95.2 | 1.96 |
| 6 | 1.81 | 94.9 | 1.99 |
| 7 | 1.87 | 94.4 | 2.00 |
| 8 | 1.87 | 95.6 | 1.97 |
| 9 | 1.85 | 94.7 | 1.97 |
| 10 | 1.83 | 95.2 | 1.99 |
| 11 | 1.88 | 95.1 | 2.02 |
| 12 | 1.90 | 94.1 | 2.05 |
| 13 | 1.82 | 94.2 | 2.01 |
| 14 | 1.90 | 93.8 | 1.99 |

-continued

| Time Min | IV dl/g | Conversion % | PDI |
|---|---|---|---|
| 15 | 1.91 | 94.7 | 2.00 |
| 16 | 1.83 | 95.1 | 1.96 |
| 17 | 1.87 | 95.6 | 1.97 |
| 18 | 1.86 | 95.1 | 1.91 |
| 19 | 1.81 | 95.2 | 1.95 |
| 20 | 1.82 | 94.1 | 1.91 |

The values for IV, conversion and PDI are constant within the measuring accuracy, from which a uniform dwell time distribution and hence a uniform flow profile can be deduced.

Measuring Methods

1. Monomer Content:
The polymer is dissolved in chloroform and precipitated with cylcohexane and filtered off. The dilactide content of the solution is determined by, means of HPLC and the conversion is calculated therefrom.

2. IV
The polymer is dissolved in chloroform. The viscosity of the solution is determined in at Ubbelohde-viscometer and converted into an intrinsic viscosity.

3. PDI
The number average and the weight average of the molecular weight of the polymer were determined with GPC. The calibration of GPC was effected against polystyrene standards. The PDI is the ratio of weight and number average.

The invention claimed is:

1. A method for the production of polylactide by ring-opening polymerisation of dilactide comprising:
   a) feeding dilactide into at least one stirred vessel and/or a loop-type bubble column as a first polymerisation step and implementing a prepolymerisation; and
   b) transferring the obtained prepolymer into at least one tubular reactor as a second polymerisation step, the tubular reactor comprising non-mixing baffles, and implementing a polymerisation reaction, to produce polylactide.

2. The method according to claim 1, wherein the prepolymerisation is implemented in step a) up to a maximum conversion of the dilactide of approximately 5 to 70% by mole.

3. The method according to claim 1, wherein the polymerisation reaction is implemented in step b) up to a maximum melt viscosity of approximately 100 Pa·s to 25,000 Pa·s.

4. The method according to claim 1, wherein the polymerisation reaction is implemented in step b) up to a conversion of the dilactide of at least approximately 90% by mole.

5. The method according to claim 1, wherein stabilisers are mixed with the polylactide subsequent to step b).

6. The method according to claim 1, wherein, subsequent to step b), demonomerisation is effected by extraction with a solvent and/or by vacuum degassing.

7. The method according to claim 1, wherein polymerisation catalysts are mixed into the dilactide before step a) and/or before step b).

8. The method according to claim 1, wherein, subsequent to step b), at least one additive is mixed with the polylactide, wherein the at least one additive comprises nucleation agents, colourants, reinforcing materials, processing aids, plasticisers, modification agents, fillers and/or antioxidants.

9. The method according to claim 1, wherein, subsequent to step b), at least one further polymer is blended with the polylactide.

10. The method according to claim 1, wherein the dilactide originates from a preceding cleaning device and/or a preceding condensation device.

11. The method according to claim 1 for the production of poly-L-lactide, poly-D-lactide, poly-mesolactide, or a combination thereof.

12. The method according to claim 1, wherein the baffles comprise perforated hole discs, displacement bodies, concentric annular gaps and/or tubular elements.

13. The method according to claim 12, wherein the concentric annular gaps, displacement bodies and/or tubular elements are configured, dependent upon the radial arrangement thereof with respect to the cross-section of the tubular reactor, with different lengths in the axial direction of the tubular reactor.

14. The method according to claim 12, wherein it is ensured by the baffles that the quotient of minimum dwell time of the part of the fluid which flows most quickly through the tubular reactor and the average dwell time of the entire fluid in the tubular reactor is at least 0.5.

15. The method according to claim 12, wherein the baffles of the tubular reactor produce a maximum variation coefficient V of 0.8, V being defined according to the following equation, $$V = \frac{S}{c_S}$$

S representing the random sample variance according to $$S = \sqrt{\frac{1}{n-1} \cdot \sum_{i=1}^{n} (c_i - c_S)^2}$$

and $c_i$ meaning the concentration of an indicator substance of a random sample removed at a randomly chosen position i of the outlet surface of the tubular reactor, the indicator substance being introduced at a randomly chosen position of the inlet surface of the tubular reactor, $c_s$ representing the arithmetic mean of the concentrations of removed random samples according to $$c_S = \frac{1}{n}\sum_{i=1}^{n} c_i$$

and n meaning the number of random samples.

* * * * *

UNITED STATES PATENT AND TRADEMARK OFFICE
CERTIFICATE OF CORRECTION

PATENT NO. : 8,399,602 B2  Page 1 of 1
APPLICATION NO. : 12/676299
DATED : March 19, 2013
INVENTOR(S) : Hagen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this
First Day of September, 2015

Michelle K. Lee
*Director of the United States Patent and Trademark Office*